(12) United States Patent
Contadini et al.

(10) Patent No.: US 6,401,384 B1
(45) Date of Patent: Jun. 11, 2002

(54) INSECT BAIT STATION

(75) Inventors: Carl D. Contadini, Terryville; Nicholas A. Velezis, Middlebury; John J. Dean, Oxford, all of CT (US)

(73) Assignee: Waterbury Companies, Inc., Waterbury, CT (US)

( * ) Notice: Subject to any disclaimer, the term of this patent is extended or adjusted under 35 U.S.C. 154(b) by 0 days.

(21) Appl. No.: 09/697,414

(22) Filed: Oct. 26, 2000

(51) Int. Cl.[7] .......................... A01M 1/20; A01M 5/00; A01M 7/00; A01M 17/00; A01M 19/00; A01M 25/00; A01M 1/10
(52) U.S. Cl. ...................... 43/132.1; 43/131; 43/107
(58) Field of Search ................ 43/121, 131, 132.1, 43/107

(56) References Cited

U.S. PATENT DOCUMENTS

| | | | |
|---|---|---|---|
| 5,943,816 A | * | 8/1999 | Hyatt et al. .................. 43/131 |
| 6,219,961 B1 | * | 4/2001 | Ballard et al. ................ 43/131 |
| 6,223,465 B1 | * | 5/2001 | Soller et al. .................. 43/131 |
| 6,272,790 B1 | * | 8/2001 | Paganessi et al. ............ 43/107 |
| 6,304,185 B1 | * | 10/2001 | Tuttle et al. ............. 340/573.2 |

* cited by examiner

Primary Examiner—Charles T. Jordan
Assistant Examiner—Bethany L Griles
(74) Attorney, Agent, or Firm—Carmody & Torrance LLP

(57) ABSTRACT

An insect bait station comprising a housing having an outer wall forming an opening therein and a region therein to receive an insect bait formulation, a cover, securable to the housing, and having an outer surface and an inner surface, and a plurality of gates forming gate openings sized to allow selective entry of insects, wherein the cover further includes an aperture with a seal disposed therein, the seal including a slit dimensioned to permit replenishment of the insect bait formulation in the housing while essentially preventing the undesirable escape of insect bait station formulation therethrough. A method of inserting insect bait formulation into the insect bait station is provided, as well as an improved construction to for mounting the insect bait station into the ground, in which a security stake is provided that includes a longitudinal body having a channel formed therein for releaseably receiving at least a portion of the anchoring stake therein, the longitudinal body preferably including a plurality of ribs that comprise a plurality of anchoring barbs along the surface thereof, wherein the anchoring barbs are angled along the surface of the body such that when at least some of the anchoring barbs are below the surface of the ground, the security stake is resistible to an upward pressure in a direction away from the ground.

9 Claims, 5 Drawing Sheets

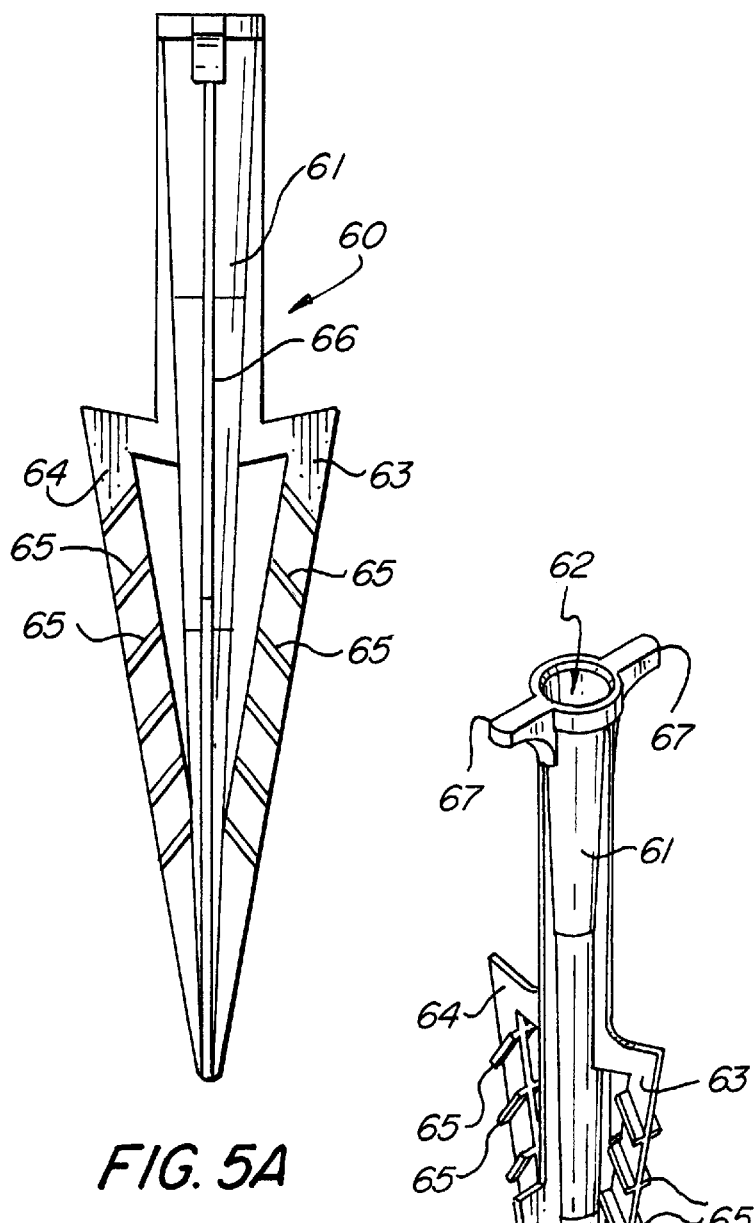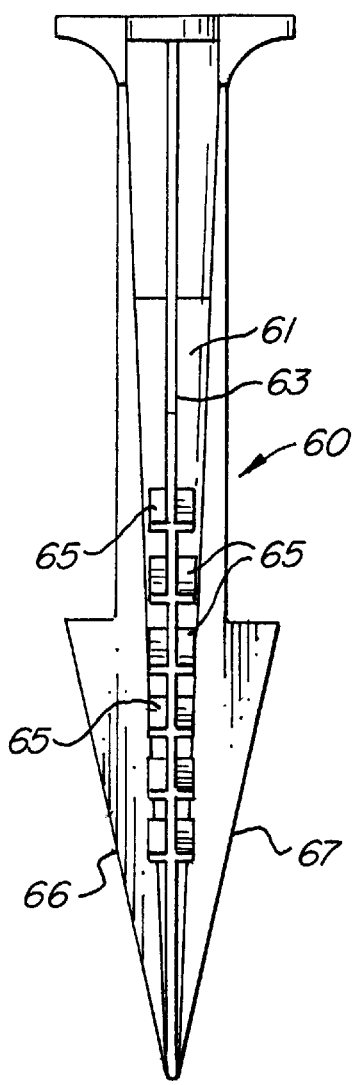
FIG. 5A
FIG. 5B
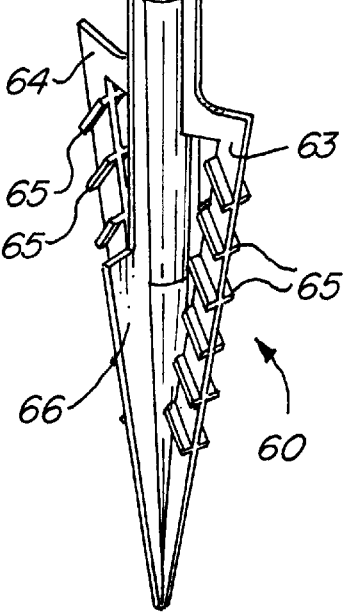
FIG. 5C

INSECT BAIT STATION

FIELD OF THE INVENTION

The present invention relates to a bait station in which is placed an insect bait formulation comprising an insect attractant and/or an insect poison material to destroy insects, particularly a poison for crawling insects. More specifically, the present invention is directed to a bait station that provides for easier insect bait formulation replenishment as well as an improved arrangement for securing the bait station into the ground.

BACKGROUND OF THE INVENTION

Bait stations and devices for holding a bait formulation comprising an attractant with a poison to destroy pests, particularly crawling insects, are known. Examples of such constructions are described in U.S. Pat. No. 4,485,582 to Morris, U.S. Pat. No. 4,837,969 to Demarest, U.S. Pat. No. 4,894,947 to Brandli, U.S. Pat. No. 5,033,229 to Demarest et al. and U.S. Pat. No. 5,548,922 to Wefler.

The inventors of the present invention perceived many deficiencies in the prior art constructions and therefore filed for a U.S. patent on an improved construction that overcame many, if not all of the perceived deficiencies. The aforementioned improved construction is the subject of U.S. patent application Ser. No. 09/181,169, now U.S. Pat. No. 6,219,960, the disclosure of which is incorporated by reference as if fully set forth herein, and assigned to the assignee of the instant invention.

However, subsequent to the filing of the aforementioned application, it was discovered that still further enhancements were warranted. For example, it was found that a still further improved construction that provides for easier bait formulation refill was desired. For example, currently it is necessary to either use an entirely new cartridge or remove the cover to refill or replenish the insect bait formulation. For a professional or other individual that has many stations to attend to, such a task is burdensome. An effective time-efficient way to refill or replenish the bait station is desired.

It was further found out that an improved construction that provides for a better in-ground securing methodology was desired. For example, a way to more securely provide the bait stations in the ground to prevent tampering and pilferage while at the same time providing convenience to the person changing or removing the units is desired. Still further, all the objects and advantages afforded by Applicants' prior invention disclosed and claimed in the aforementioned '169 application were desired.

The present invention achieves the foregoing by providing all the newly desired advantages set forth above and below, while also providing the advantages, such as effectiveness and safety, afforded by the invention disclosed in the above-mentioned '169 application. In particular, the present invention improves the state of the art by providing an insect bait station that facilitates replenishment thereof with the insect bait formulation and also provides for a more securable method of securing the bait station into the ground.

SUMMARY OF THE INVENTION

Accordingly, it is an object of the present invention to provide an insect bait station that attracts and allows entry of selected insects.

It is another object of the present invention to provide an insect bait station that provides the ability to readily refill, change or replenish the bait formulation, either by the manufacturer or an end user of the bait station.

It is yet a further object of the present invention to provide an insect bait station where the integrity and amount of the bait formulation can be more readily monitored than in conventional insect bait stations.

It is yet another object of the present invention to provide an insect bait station which allows the rate of evaporation of a bait formulation to be controlled, thereby improving bait life and effectiveness.

It is still another object of the present invention to provide an improved bait station that is more securable into the ground.

It is yet a further object of the present invention to provide an improved bait station that more effectively protects against tampering and pilfering of the bait stations, such as by children or animals.

It is another object of the present invention to provide an improved bait station that more effectively guards against the coming into contact with active and potentially dangerous ingredients, such as by children or animals.

It is another object of the present invention to provide an improved bait station that is durable for repeated use and will last a long time.

It is yet another object of the present invention to provide an insect bait station that utilizes maximum anchoring efficiency.

To overcome the deficiencies of the prior art and to achieve the objects and advantages listed above and below, an improved insect bait station is disclosed. In a preferred embodiment, the insect bait station comprises a housing having an outer wall forming an opening therein and a region therein to receive an insect bait formulation, a cover, securable to the housing, and having an outer surface and an inner surface, and a plurality of gates forming gate openings sized to allow selective entry of insects, wherein the plurality of gates are coupled to the cover and are preferably positioned on the inside surface of the cover and beyond the outer wall of the housing such that access to the insect bait formulation is achieved by entering between the plurality of gates between the outer wall of the housing and the cover, wherein the cover further includes an aperture with a seal disposed therein, the seal including a slit dimensioned to permit replenishment of the insect bait formulation in the housing while essentially preventing the undesirable escape of insect bait station formulation therethrough. In a preferred embodiment, the gates are integrally formed on the cover's inner surface but this is by way of example and not limitation.

In another embodiment, the insect bait station may comprise a housing having an outer wall forming an opening therein and a region therein to receive an insect bait formulation, and a cover, securable to the housing, the cover having an outer surface and an inner surface, the cover further including an aperture with a seal disposed therein, the seal including a slit dimensioned to permit replenishment of the insect bait formulation in the housing while essentially preventing the undesirable escape of the insect bait formulation therethrough, wherein access to the insect bait formulation is achieved by entering the insect bait station between the inside surface of the cover and beyond the outer wall of the housing.

In yet another embodiment of the present invention, a method of inserting insect bait formulation into the insect bait station is provided, wherein the method comprises the steps of: inserting an apertured member, out of which the insect bait formulation exits, through the slit in the seal, causing a desired amount of insect formulation to exit the apertured member and enter the insect bait station and removing the apertured member from the seal so that the slit closes to prevent any undesirable escape of insect bait formulation therethrough.

In yet a further embodiment of the invention, a security stake for use with an insect bait station comprising a housing, a cover securable to one side of the housing and an anchoring stake coupleable to another side of the housing, is provided. In this embodiment, the security stake comprises a longitudinal body having a channel formed therein for releaseably receiving at least a portion of the anchoring stake therein, the longitudinal body comprising a plurality of anchoring barbs along at least one side surface thereof, wherein the anchoring barbs are angled along the surface of the body such that when at least some of the anchoring barbs are below the surface of the ground, the security stake is resistible to an upward pressure in a direction away from the ground. In a specific configuration, the security stake includes at least first and second ribs extending from the body, wherein each of the first and second ribs include at least one anchoring barb thereon, and in a more specific embodiment, a plurality of anchoring barbs are formed on each of the first and second ribs. However, it should be understood that multiple ribs with barbs on each of them are contemplated by the present invention.

Lastly, in yet another embodiment, it is envisioned that the anchoring stake itself may be configured to include a longitudinal body releaseably securable to the housing, the longitudinal body comprising a plurality of anchoring barbs along at least one side surface thereof, wherein the anchoring barbs are angled along the surface of the body such that when at least some of the anchoring barbs are below the surface of the ground, the housing is resistible to an upward pressure in a direction away from the ground. In a preferred embodiment, the anchoring stake may have one or more ribs with barbs on them as disclosed below.

BRIEF DESCRIPTION OF THE DRAWINGS

The invention and its particular features and advantages will become more apparent from the following detailed description when considered with reference to the accompanying drawings in which:

FIGS. 5A, 5B, 5C are respective front, side and perspective views of the security stake constructed in accordance with the present invention.

DETAILED DESCRIPTION OF THE PREFERRED EMBODIMENT

Figure 1:
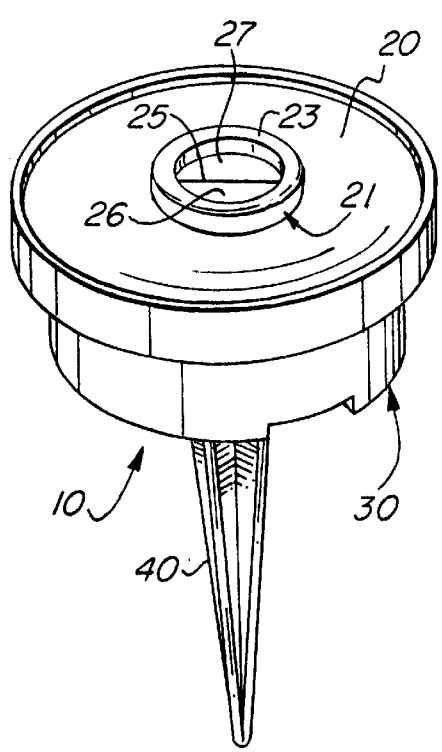
FIG. 1 is a front perspective view of an insect bait station constructed in accordance with the present invention.

Referring to the drawings in detail, an insect bait station is shown and generally designated by the reference numeral 10. It should be noted that for the sake of clarity all the components and parts of insect bait station 10 may not be shown and/or marked in all the drawings. As used in this description, the terms "up", "down", "top", "bottom", etc. refer to insect bait station 10 when in the orientation illustrated in FIG. 1, although it will be understood that insect bait station can be utilized in a variety of orientations.

Figure 2:
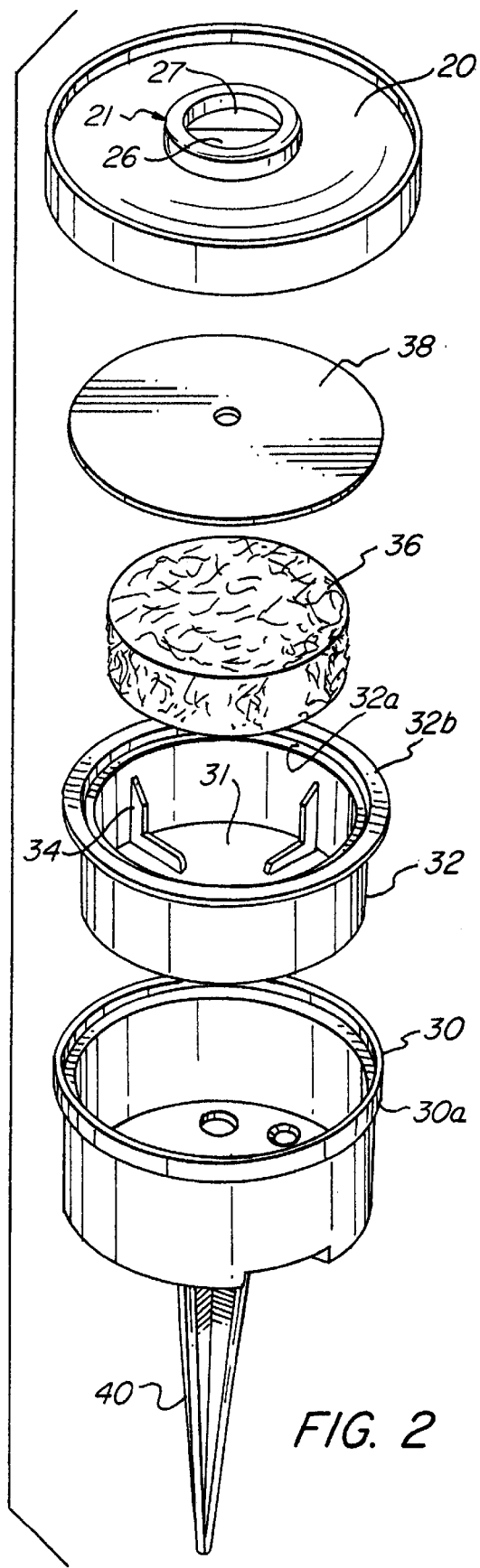
FIG. 2 is an exploded front perspective view of the insect bait station shown in FIG. 1.

Referring to FIGS. 1 and 2, insect bait station 10 may comprise one or more of the following: a removable cover 20, a membrane 38, an insert support 36, a cartridge 32 and a receptacle or housing 30 to which an anchoring stake 40, or other means to affix housing 30 to (i.e., plant housing 30 in) the ground or a surface can be attached. Bait station 10 can assume any particular shape such as round or rectangular, and can be formed of any material having the desired structural integrity and dimensional stability required of the unit. Cover 20, housing 30 and anchoring stake 40 can be formed of any suitable material, such as dimensionally stable plastic or metal. Most preferably, cover 20 and housing 30 together with stake 40 are formed of a dimensionally stable plastic material, such as filled 20% calcium carbonate polypropylene.

The present invention may utilize a replaceable cartridge 32 housed within housing 30. The cartridge forms an opening or reservoir for containing an insect bait formulation. Cartridge 32 preferably has a cylindrical form with a bottom surface 31 and a plurality of "L" shaped ribs 34 (or other configuration to achieve the function set forth below) depicted in FIG. 2. It should be understood that omission of such ribs 34 is also contemplated hereby. Preferably, cartridge 32 will contain prepared bait formulation as part of the unit. Cartridge 32 can likewise be formed of any suitable material, such as dimensionally stable plastic or metal.

Preferably, a membrane 38 will cover the opening or reservoir of cartridge 32, and cartridge 32 preferably includes a lipped flange 32a circumferentially surrounding the edge of cartridge 32 for support therefor. Membrane 38 functions to limit the evaporation and exposure of a bait formulation comprising an insect attractant capable of attracting insects to the bait station 10 and/or an insect poison material to destroy insects, wherein the bait formulation resides in housing 30, or preferably, the reservoir of cartridge 32. The properties of the membrane 38 have the ability to retard the evaporation of the bait formulation. Any membrane can be used which permits the insect bait formulation to communicate with an environment external to the opening of cartridge 32. Membrane 38 is made preferably of a polyester material or any other material that retards evaporation of the bait formulation, land can be of a variety of thicknesses, but is preferably 1 to 35 mils.

An insert support 36 may be disposed within cartridge 32 and above the bottom surface 31 and away from the walls of cartridge 32. Ribs 34 function to provide such spacing. This seating provides the advantage of allowing targeted insects to crawl around and insert support 36 once the insects have entered bait station 10 to better access the bait formulation stored in the reservoir formed by cartridge 32. In a preferred embodiment, insert support 36 comprises a mesh material capable of supporting the weight of insects entering the reservoir through an opening in membrane 38. Insert support 36 functions to provide a substrate for the insect bait formulation. It can also act as a support to assist in maintaining the membrane in position. The mesh material may be made of any dimensionally stable plastic or metal for the application. The mesh material for support 36 has a pore density expressed in pores per inch (ppi), which can be varied to suit the particular pest targeted for destruction by the bait station. For example, support 36 having a density of 3–5 ppi would be suitable for destroying carpenter ants. It is understood that support 36 is not limited to any particular pore density and can be changed to suit the desired requirements.

Figure 6A:
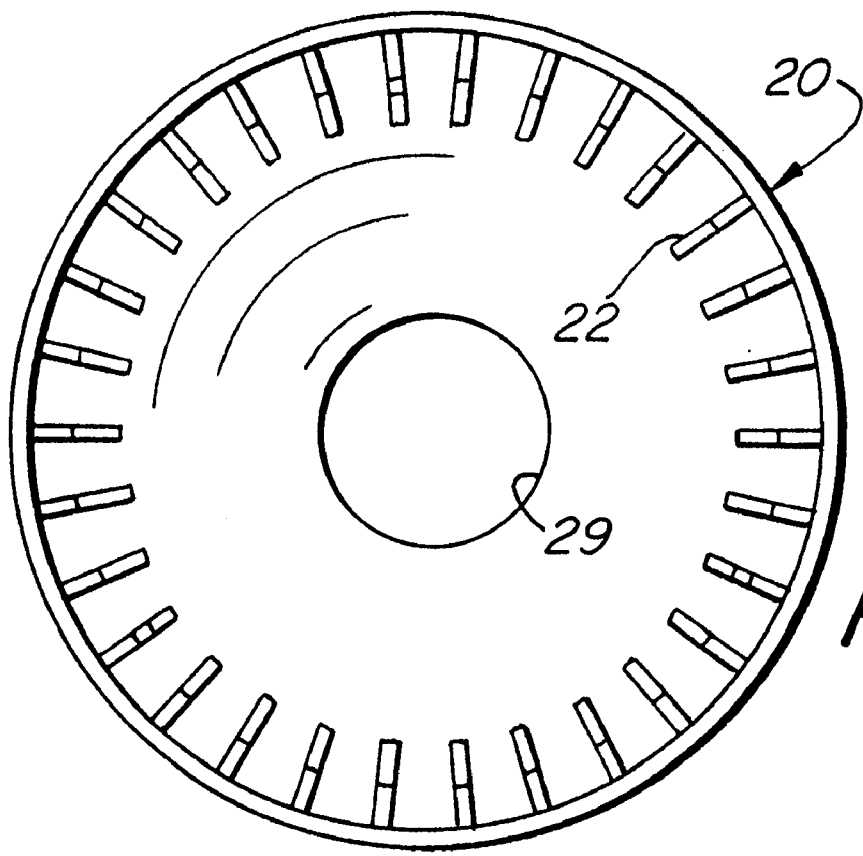
FIGS. 6A and 6B are respective plan and partial perspective views of the cover constructed in accordance with the present invention.
Figure 6B:
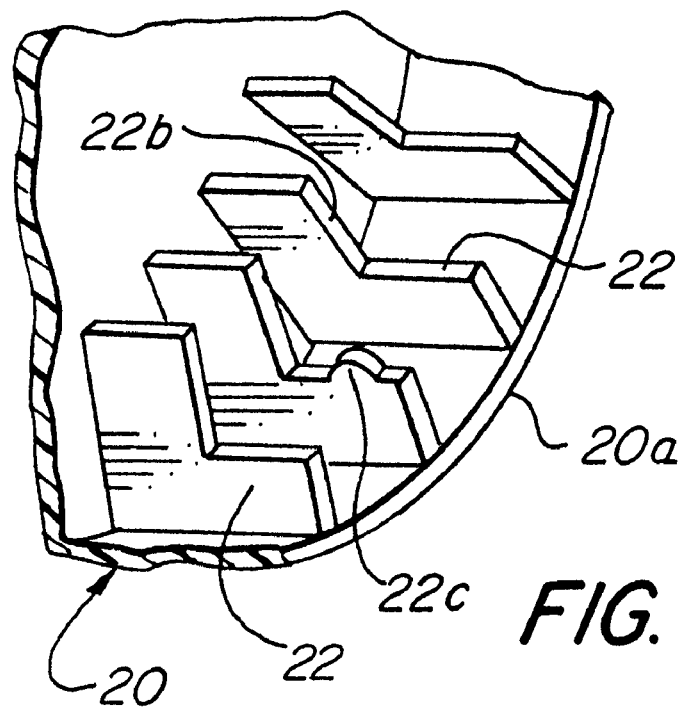

As depicted in FIGS. 6A and 6B and discussed in greater detail in the '169 application, cover 20 preferably includes a plurality of gate openings formed by "L" shaped gates 22 preferably integrally formed on an inner surface of cover 20. However, for completeness, it should be understood that in its broadest sense the gates are merely coupled to the surface of the cover since it could be envisioned that rim 20a of cover 20 could be omitted while still remaining in the scope of the present invention. However, in a preferred embodiment, rim 20a is present and therefore the gates are positioned on the inside surface of the cover. Similarly, it is also envisioned and is supported by the claims herein, that the gates could be molded to the outside surface of the housing so as to achieve the unique functionality of the present invention. In this example, the cover need not include any gates and would merely be disposed over the housing and the gates molded to the outer surface of the housing. The gates are preferably spaced equidistant from each other, and positioned circumferentially about cover 20. The gates form openings through the lip of cover 20 providing access to insects attracted to bait station 10.

Advantages of this construction are numerous. For example the type of insects targeted for attraction by the bait station can be precisely selected by the size of the gate openings, where entry of larger insects can be prevented by selection of the appropriate spacing of the gates. Consequently, the bait formulation in the bait station is only consumed by the targeted insects and not by larger non-targeted insects, thereby improving the efficacy of bait station 10. Additionally because the gates can be positioned about the entire edge of cover 20, the number of openings for insect entry into the bait station can be maximized, thereby also improving the efficacy of the bait station 10. Further, by providing a removable cover 20, each bait station can target varying insects at different times by simply replacing cover 20 with another cover having the gates spaced at a different interval. This can be done during manufacturing and assembly of bait station 10, thereby allowing different bait stations to be produced with little change to the overall process. This allows for simpler implementation of product changes, increased production efficiency, greater product variety, and fewer product flaws with decreased overall manufacturing costs. This cover change can also be done by an end user thereby eliminating the need to purchase multiple bait stations. Still further, if the spacing between the gates is not all equidistant, but are varied or staggered, selective entry of more than one targeted insect pest is achievable. For example, it may be desired to target two types of insects, where one insect is larger than the other, but where the goal is to control the population of the larger targeted insect, yet exterminate the smaller targeted insect. The present invention, with alternate spacing of the gates, allows bait station 10 to target larger insects yet limit their entry due to the presence of many other smaller spacings between the gates. In this way, larger targeted insects are provided access to a lesser extent than smaller insect targets which can better achieve the goal of controlling different insect populations to a desired ratio.

Figure 3:
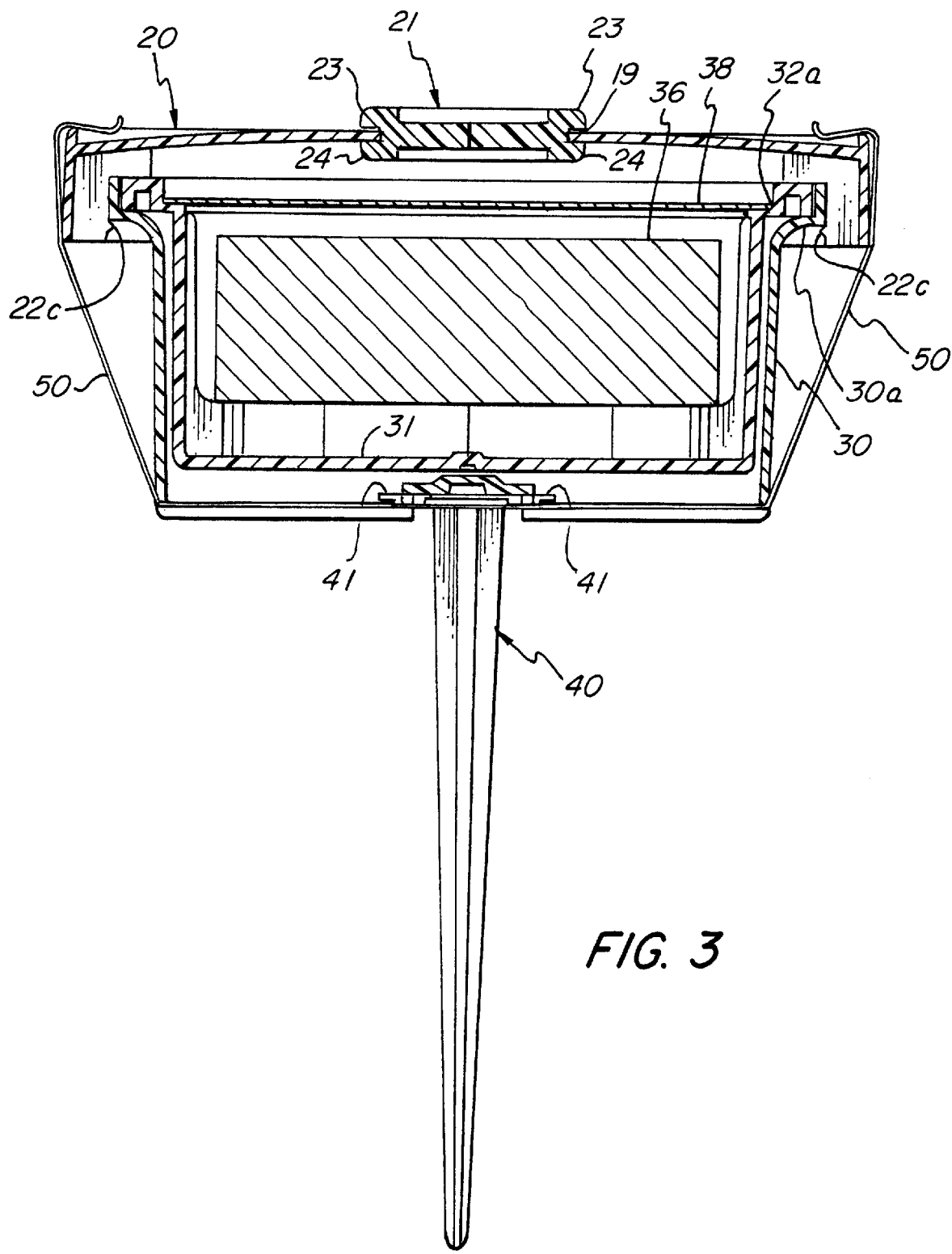
FIG. 3 is a cross sectional view of an insect bait station constructed in accordance with the present invention showing both details disclosed in Applicants' '169 application and showing the refill seal of the present invention.

As shown in FIGS. 3 and 6B, gates 22 may comprise means for catching housing 30 within cover 20 such as rounded catch 22c. Cover 20 may be snap fitted onto housing 30 by a plurality of such catches 22c, each of which may be spaced preferably about 120 degrees apart from the other. Such catches are optional, as good friction fitting between the cover 20 and housing 30 also works well. These catches are designed to hold the bottom of the flange 30a of housing 30, as shown in FIG. 3. The top of flange 32b of cartridge 32 housed within housing 30 may be secured against the edge 22b of the gates, thereby providing a form-fitting station comprising cover 20, housing 30 and cartridge 32 within housing 30. Membrane 38 may be secured onto lip 32a with an adhesive or other known bonding methodology thereby also securing insert support 36 within cartridge 32 forming a secure insect bait station 10.

An adhesive pad may also be affixed to the bottom surface of housing 30 to allow mounting to a suitable surface. In this case, stake 40 would be removed. A suitable mounting surface for housing 30 (and therefore insect bait station 10) can be any surface to which the insect bait station 10 is desired to be mounted, such as a wall, door, ceiling, etc., provided the bait formulation is in a state that allows the desired mounting orientation. It is understood that the mounting of the bottom surface in this manner is not limited to an adhesive pad but may be through the agency of, for instance, screws, anchors, etc., wherein housing 30 is mounted, either directly or indirectly to a suitable mounting surface.

A covering material such as foil can be provided across the top of housing 30 or flange 32b of cartridge 32, and is preferably impermeable to the insect bait formulation and prevents the release of the insect bait formulation contained therein between the time of manufacture and the time of use. Such a foil is securely bonded to the top of housing 30 or to flange 32b by heat and/or pressure bonding. Alternatively, ultrasonic welding or a suitable adhesive may be used to make this bond. A tab may be provided so the foil seal can be removed when the bait station is to be activated in the environment it is placed.

It is preferred that the bait formulation comprise an insect poison material of a slow-kill or delayed action nature of the sort well known in the art, so that the feeding insect may leave the insect bait station and return to its nest or hive to redistribute the poisoned bait to kill other insects that have not entered the bait station. One such formulation is a solution or mixture containing boric acid. Other examples of delayed action bait formulations that include insect attractants and a poison material are described in U.S. Pat. No. 5,033,229 (an aqueous solution), U.S. Pat. No. 4,485,582 to Morris (a solid material), or in U.S. Pat. No. 4,841,669 to Demarest et al, the disclosures of which are incorporated by reference as if fully set forth herein. Alternatively, the bait formulation may be carried in a gel form in the cartridge 32. The gel can be either a hot-type or a cold-type gel formulation, the composition of which varies depending upon the desired insect poison and attractant material, the desired release rate and concentration, and the retardation of membrane 38. Specific gelling agents, solvents :and encapsulants that may be used include, but are not limited to, those described in U.S. Pat. No. 5,575,992 to Kunze, which is hereby incorporated by reference as if fully set forth herein It is understood that the present invention is not limited to any particular insecticide or poison material, or any particular insect attractant, or any particular bait formulation of an insect attractant and an insect poison. For instance, a pheromone or combination of pheromones can be used to draw insects to bait station 10. A scent, such as the scent of a food like peanut butter can be employed as an insect attractant to draw insects to bait station 10.

Other details not material to the present invention may be found in U.S. application Serial No. 09/181,169, such as the use of a clip 50 for securing the cover 20 to housing 30 through the action of holding forces exerted by tension created in the form and position of the material forming the clip and the clip's contact with cover 20 and housing 30.

As known from Applicants' prior disclosure, cartridge 32 is replaceable making the insect bait station 10 effective for many years, if not indefinitely. However, in accordance with the present invention, refilling or replenishing the insect bait formulation has been made much simpler. To that end, reference is now made to FIGS. 1–3, which shows a first aspect of the present invention. Specifically illustrated is a seal, generally indicated at 21. Seal 21 is disposed in an aperture 29 (FIG. 6A) within the top of cover 20 and preferably in the middle thereof. As shown best in FIG. 3, seal 21, which is preferably made of rubber or flexible plastic, is preferably disc shaped having a middle channel 19 thereby dividing seal 21 into an outer ring or outer part 23 and an inner ring or inner part 24. In this way, seal 21 is positioned over aperture 29 in cover 20 and sufficiently malleable so as to allow the edges of the cover 20 formed by the aperture to be inserted into channel 19. That is, outer part 23 can be seen above the surface of cover 20 in FIG. 1 while inner part 24 can only be seen from within the inner surface of cover 20 (FIG. 3). Seal 21 is sized to friction fit within aperture 29 securely so as to prevent inadvertent or undesirable removal therefrom. Seal 21 also includes a slit 25 formed by flaps 26, 27. Flaps 26, 27 and thus slit 25 remain closed under normal conditions of use to prevent spilling of the bait formulation. However, flaps 26, 27 are sufficiently flexible to permit a hose or nozzle to fit therebetween and, thus, into bait station 10 to replenish the bait formulation without removing cover 20. It can therefore be seen that replenishment or refilling of the insect bait formulation can now be done without the need to replace cartridge 32 (in fact, seal 21 can eliminate the need for cartridge 32, with housing 30 acting as the bait formulation reservoir). The advantages of the use of seal 21 are especially apparent to the professional user, such as an exterminator, who may have several, or many, bait stations 10 to maintain. Therefore, it can be seen that cover 20, securable to housing 30, can further include an aperture with a seal 211 disposed therein, the seal including a slit 25 dimensioned to permit replenishment of the insect bait formulation in the reservoir while essentially preventing the undesirable escape of insect bait station formulation therethrough. Likewise, the flaps 26, 27 are sufficiently flexible to permit an end of a hose or nozzle to fit therebetween to fill or replenish the insect bait station with insect bait formulation.

Based on the foregoing, it can also be seen that an improved method of inserting insect bait formulation into an insect bait station is provided, wherein the method comprises the steps of: inserting an apertured member, such as a hose, nozzle or other member that may even be coupled to a compressed air sprayer (not shown) out of which the insect bait formulation exits, through slit 25 in the seal 21, causing a desired amount of insect bait formulation to exit the apertured member and enter the insect bait station 10 and removing the apertured member from the seal 21 so that slit 25 closes to prevent any undesirable escape of insect bait formulation therethrough. As should be understood, the apertured member may be coupled to a container, wherein the container includes the insect bait formulation in liquid form or it may be coupled to the aforementioned compressed air sprayer.

In operation, insect bait station 10 may be mounted in the earth, or on a mounting surface as described above. If mounted in the earth, reference should be had to FIGS. 4, 5A, 5B and 5C in combination with the following, in which a second aspect of the present invention is disclosed. In accordance with this embodiment, a security stake, generally indicated at 60, is disclosed for use with insect bait station 10 in the manner disclosed above. In particular, security stake 60 includes a longitudinal body 61 having a channel 62 formed therein for releaseably receiving at least a portion of anchoring stake 40 therein. Longitudinal body 61 includes a plurality of anchoring barbs 65 along at least one side surface thereof In a preferred embodiment, security stake 60 includes at least a first rib 63 and a second rib 64 extending from body 61, wherein each of the first and second ribs include at least one anchoring barb 65 thereon, and preferably, include a plurality of barbs 65 on each rib 63, 64 as clearly depicted in FIGS. 5A, 5B and 5C. As is most clearly seen in FIG. 5B, each rib 63, 64 includes respective first and second side surfaces with each of the first and second side surfaces of each respective rib 63, 64 including at least one, and preferably more than one anchoring barb 65 thereon. Preferably for ease of molding, all the anchoring barbs 65 are integrally formed on each of the respective ribs 63, 64.

Additionally, security stake 60 may include a third and fourth rib, respectively 66, 67 that extend from body 61. These ribs, may be shorter, and are preferably in a plane orthogonal to the plane in which the first and second ribs 63, 64 lie. These ribs 66, 67 may or may not include additional anchoring barbs. Likewise, ribs 66, 67 may be integrally; formed and molded with body 61 so as to be able to make security stake 60 a unitary member formed of plastic.

Figure 4:
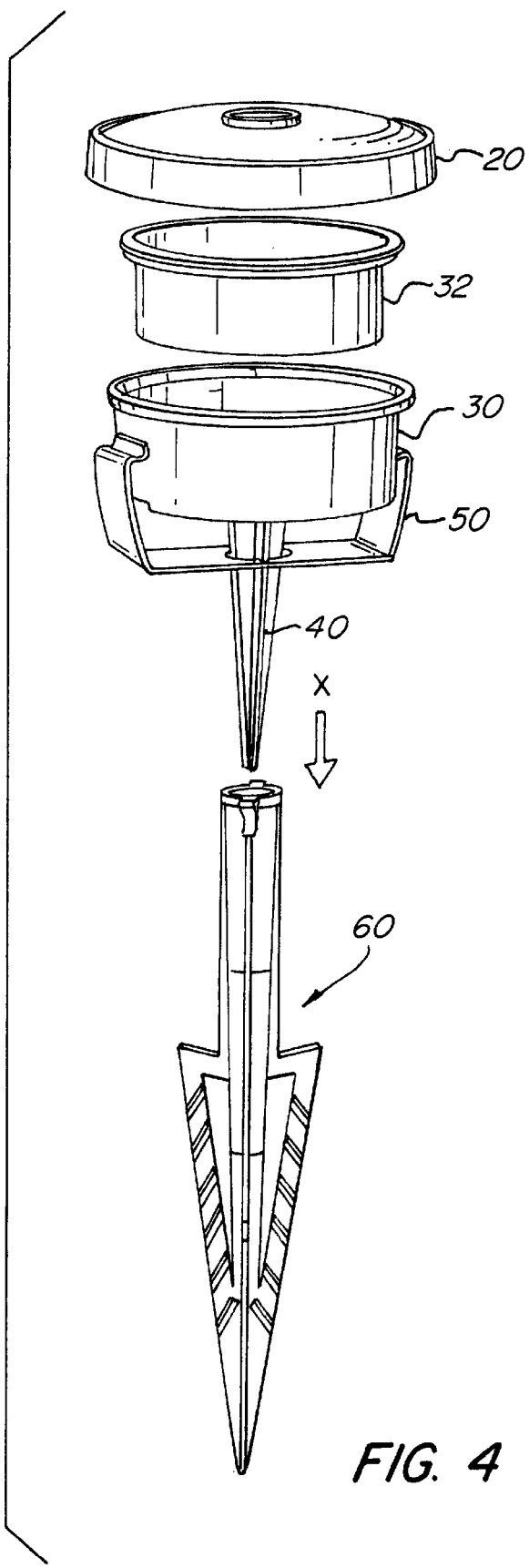
FIG. 4 is an exploded view of another aspect of the present invention, and in particular, a security stake constructed in accordance with the present invention.

In the preferred embodiment and depicted most clearly in FIG. 4, bore 62 of longitudinal body 61 is dimensioned to provide a friction fit with anchoring stake 40. In use, the security stake 60 is inserted into the ground such that at least one, if not more than one of the anchoring barbs 65 are below the surface of the ground. In this way, security stake 60 is resistible to an upward pressure in a direction away from the ground since the barbs 65 are angled along the surface of the ribs 63, 64 as shown in the Figures. Arms 67 may be likewise integrally formed on body 61 to assist in inserting stake 60 into or removing stake 60 from the ground.

Next, insect bait station 10 may be inserted into security stake 60 by inserting anchoring stake 40 into bore 62 of body 61, such as by moving stake 40 in a downward direction (i.e. the "x" direction in FIG. 4) towards stake 60. Bore 62 is deep enough to cause stake 40 to be secured therein without tipping over but at the same time, causing a sufficient friction fit to prevent anchoring stake 40 from being undesirably released from the bore 62 of security stake 60 but sufficient to allow removal if desired or necessary.

It is also contemplated that arms 67 could be directly insertable into the bottom surface of housing 30 in a manner similar to that of anchoring stake 40 (see FIG. 3 in which it is clear that stake 40 is inserted upwardly into the bottom of housing 30 and rotated 90 degrees such that the arms 41 of stake 40 can catch the bottom inner surface of housing 30 to secure stake 40 therein). Similarly, arms 67 can be made flatter to likewise be insertable into the bottom surface of housing 30 which would eliminate the need for the second stake 40 in this case. In this embodiment, arms 67 would act as housing securing members for releaseably securing the security stake to the housing.

If a new cartridge is being used, the end user can activate the bait formulation by lifting cover 20 from housing 30 and removing the foil seal provided across the top of cartridge 32 as discussed above. The cover 20 is then replaced over cartridge 32 as discussed above. Clip 50 can be placed over cover 20 securing it to housing 30 to minimize or prevent tampering with bait station 10. Once insects are drawn to bait station 10, insects of only a size targeted for entry between gates 22 of cover 20 can enter the bait station. Once the targeted insects enter the bait station 10, they must traverse membrane 38 and are further drawn to enter the reservoir of cartridge 32 that houses the bait formulation through an opening provided in membrane 38. The insects then contact the bait formulation with the poison material land exit the reservoir of cartridge 32 back through the opening of membrane 38, eventually leaving bait station 10 through gates 22 and eventually dying.

Once a sufficient number of insects have exhausted the bait formulation housed in the bait station 10, it can be refilled or replenished as set forth above in accordance with the present invention.

It should be noted that bait station 10 has been described for use with crawling insects for the sake of convenience only. Other pests may be destroyed in the same manner.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. An insect bait station comprising:

a housing, the housing having an outer wall forming an opening therein, and a region therein to receive an insect bait formulation;

a cover, securable to the housing, the cover having an outer surface and an inner surface, and a plurality of gates forming gate openings sized to allow selective entry of insects, wherein the plurality of gates are coupled to the cover and beyond the outer wall of the housing such that access to the insect bait formulation is achieved by entering between the plurality of gates between the outer wall of the housing and the cover;

wherein the cover further includes an aperture with a seal disposed therein, the seal including a slit dimensioned to permit replenishment of the insect bait formulation in the housing while essentially preventing the undesirable escape of insect bait station formulation therethrough.

2. The insect bait station as claimed in claim 1, wherein the seal is formed of a flexible material.

3. The insect bait station as claimed in claim 2, wherein the seal is formed of rubber.

4. The insect bait station as claimed in claim 3, wherein the seal includes flaps that are sufficiently flexible to permit an end of a hose or nozzle to fit therebetween to fill or replenish the insect bait station with insect bait formulation.

5. The insect bait station as claimed in claim 1, wherein the plurality of gates are integrally formed on the inner surface of the cover, and including a membrane, disposed intermediate the region formed to receive an insect bait formulation and the cover when the cover is positioned on the housing, the membrane including at least one opening for access to the insect bait formulation, said membrane having sufficient dimensional stability and structural integrity to permit an insect to traverse a top surface thereof.

6. An insect bait station comprising:

a housing, the housing having an outer wall forming an opening therein, and a region therein to receive an insect bait formulation;

a cover, securable to the housing, the cover having an outer surface and an inner surface, the cover further including an aperture with a seal disposed therein, the seal including a slit dimensioned to permit replenishment of the insect bait formulation in the housing while essentially preventing the undesirable escape of the insect bait formulation therethrough;

wherein access to the insect bait formulation is achieved by entering the insect bait station between the inside surface of the cover and beyond the outer wall of the housing.

7. A method of inserting insect bait formulation in an insect bait station, wherein the insect bait station comprises a housing having an outer wall forming an opening therein and a region therein to receive an insect bait formulation, a cover securable to the housing, the cover having an outer surface and an inner surface, and a plurality of gates forming gate openings sized to allow selective entry of insects, wherein the plurality of gates are coupled to the cover and beyond the outer wall of the housing such that access to the insect bait formulation is achieved by entering between the plurality of gates between the outer wall of the housing and the inner surface of the cover and wherein the cover further includes an aperture with a seal disposed therein, the seal including a slit dimensioned to permit replenishment of the insect bait formulation in the housing while essentially preventing the undesirable escape of insect bait station formulation therethrough, the method comprising the steps of:

inserting an apertured member, out of which the insect bait formulation exits, through the slit in the seal;

causing a desired amount of insect formulation to exit the apertured member and enter the insect bait station;

removing the apertured member from the seal so that the slit closes to prevent any undesirable escape of insect bait formulation therethrough.

8. The method as claimed in claim 7, wherein the apertured member is coupled to a container, and wherein the container includes the insect bait formulation in liquid form.

9. The method as claimed in claim 7, wherein the apertured member is coupled to a compressed air sprayer.

* * * * *